(12) United States Patent
Liu

(10) Patent No.: US 11,253,090 B2
(45) Date of Patent: Feb. 22, 2022

(54) SPILL-PROOF CUP AND CONTROL METHOD THEREOF

(71) Applicant: BOE TECHNOLOGY GROUP CO., LTD., Beijing (CN)

(72) Inventor: Cheng Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 930 days.

(21) Appl. No.: 15/988,634

(22) Filed: May 24, 2018

(65) Prior Publication Data
US 2019/0021530 A1  Jan. 24, 2019

(30) Foreign Application Priority Data

Jul. 21, 2017 (CN) .......................... 201710600667.9

(51) Int. Cl.
*G01L 1/18* (2006.01)
*A47G 19/22* (2006.01)
(Continued)

(52) U.S. Cl.
CPC ..... *A47G 19/2272* (2013.01); *A47G 19/2266* (2013.01); *E05F 15/70* (2015.01);
(Continued)

(58) Field of Classification Search
CPC ............ A47G 19/2272; A47G 19/2266; A47G 19/2227; E05F 15/70; G01C 9/06; E05Y 2400/40; E05Y 2900/602; G01L 1/18
See application file for complete search history.

(56) References Cited

U.S. PATENT DOCUMENTS 11,160,932 B2 * 11/2021 Anderson .............. A61M 39/16
11,161,082 B1 * 11/2021 Day ........................ B67C 11/00
(Continued)

FOREIGN PATENT DOCUMENTS

CN        201658160 U    12/2010
CN        103445617 A    12/2013
(Continued)

OTHER PUBLICATIONS

First Office Action for Chinese Patent Application No. 201710600667.9 dated Apr. 19, 2018.
(Continued)

*Primary Examiner* — Max H Noori
(74) *Attorney, Agent, or Firm* — Calfee, Halter & Griswold LLP

(57) ABSTRACT

A spill-proof cup includes a cup body, a cup lid disposed at the top of the cup body; a lid control device connected to the cup lid for opening or closing the cup lid; a top acceleration switch set disposed on the top of the cup body, and the top acceleration switch set including a first acceleration switch and a second acceleration switch; a bottom acceleration switch set disposed at the bottom of the cup body, and the bottom acceleration switch set including a first acceleration switch and a second acceleration switch; a controller connected to the first acceleration switches, the second acceleration switches and the lid control device, and configured to receive signals from the first and second acceleration switches, and control the lid control device according to the signal. A triggering threshold of the second acceleration switch is greater than that of the first acceleration switch.

19 Claims, 5 Drawing Sheets

(51) Int. Cl.
  *E05F 15/70* (2015.01)
  *G01C 9/06* (2006.01)
(52) U.S. Cl.
  CPC ............ *G01C 9/06* (2013.01); *A47G 19/2227* (2013.01); *E05Y 2400/40* (2013.01); *E05Y 2900/602* (2013.01); *G01L 1/18* (2013.01)

(56) References Cited

U.S. PATENT DOCUMENTS

| | | | | |
|---|---|---|---|---|
| 11,161,654 | B2* | 11/2021 | Eisner | B65D 51/24 |
| 2005/0072788 | A1* | 4/2005 | Lieberman | F16K 15/147 |
| | | | | 220/714 |
| 2005/0230404 | A1 | 10/2005 | Dark | |
| 2009/0321458 | A1* | 12/2009 | Blair | A47G 19/2227 |
| | | | | 220/709 |
| 2012/0298676 | A1* | 11/2012 | Cooks | B65D 51/28 |
| | | | | 220/592.21 |
| 2013/0060224 | A1* | 3/2013 | Young Jones | A47G 23/16 |
| | | | | 604/500 |
| 2021/0210221 | A1* | 7/2021 | Singh | G21C 7/12 |
| 2021/0212486 | A1* | 7/2021 | Morelock | A47G 19/2272 |
| 2021/0292055 | A1* | 9/2021 | Hakim | B65D 47/06 |
| 2021/0300618 | A1* | 9/2021 | Lu | B65D 3/20 |

FOREIGN PATENT DOCUMENTS

| | | |
|---|---|---|
| CN | 203828560 U | 9/2014 |
| CN | 204158135 U | 2/2015 |
| CN | 105242694 A | 1/2016 |
| CN | 105342301 A | 2/2016 |
| CN | 206120130 U | 4/2017 |
| EP | 2182827 A1 | 5/2010 |

OTHER PUBLICATIONS

Website printout: https://newatlas.com/magicup-spill-free-coffee-cup/39080/; Spill-proof Magicup lets you safely savor your morning coffee; printed Jul. 18, 2018, 17 pages.

* cited by examiner

SPILL-PROOF CUP AND CONTROL METHOD THEREOF

CROSS REFERENCE TO RELATED APPLICATIONS

This application claims the benefit of Chinese Patent Application No. 201710600667.9, entitled "Spill-proof cup and control method thereof" filed with the Chinese Patent Office on Jul. 21, 2017, the entire content of which is hereby incorporated by reference.

TECHNICAL FIELD

The present disclosure relates to the technical field of intelligent control, in particular to a spill-proof cup and a control method thereof.

BACKGROUND

In daily life, it is unavoidable that the cup is inadvertently knocked over. If the cup lid is not tightened at this time, the liquid may spill out causing trouble or loss. People have come up with delicate mechanical structures to avoid this. With the popularity of intelligent devices, intelligent water cups with controllers and power supplies have emerged, providing more ways to achieve intelligent cups with spill-proof capabilities.

SUMMARY

The present disclosure provides a spill-proof cup, including: a cup body, a cup lid disposed at the top of the cup body; a lid control device connected to the cup lid for opening or closing the cup lid; a top acceleration switch set disposed on the top of the cup body, and the top acceleration switch set including a first acceleration switch and a second acceleration switch; a bottom acceleration switch set disposed at the bottom of the cup body, and the bottom acceleration switch set including a first acceleration switch and a second acceleration switch; a controller connected to the first acceleration switches, the second acceleration switches and the lid control device, and configured to receive signals from the first acceleration switches and the second acceleration switches, and control the lid control device according to the signal; wherein a triggering threshold of the second acceleration switch is greater than a triggering threshold of the first acceleration switch.

In an exemplary embodiment, controlling the lid control device according to the signal includes: when the controller receives a signal from the second acceleration switch, the controller controlling the lid control device to close the cup lid.

In an exemplary embodiment, the spill-proof cup further includes: a stress sensor disposed on an outer side surface of the cup body, wherein the controller is configured to acquire a reading of the stress sensor to determine whether to close the cup lid.

In an exemplary embodiment, wherein controlling the lid control device according to the signal includes: when the controller receives a signal from the first acceleration switch and no signal from the second acceleration switch, the controller is configured to control the lid control device based on a reading from the pressure sensor.

In an exemplary embodiment, the top acceleration switch set includes a first acceleration switch in a horizontal direction and a second acceleration switch in the horizontal direction; and the bottom acceleration switch set includes a first acceleration switch in the horizontal direction and a second acceleration switch in the horizontal direction.

In an exemplary embodiment, the top acceleration switch set includes a first acceleration switch in a horizontal direction and a second acceleration switch in the horizontal direction; and the bottom acceleration switch set includes a first acceleration switch in the horizontal direction, a first acceleration switch in a vertical direction, a second acceleration switch in the horizontal direction and a second acceleration switch in the vertical direction.

In an exemplary embodiment, the top acceleration switch set includes: a first acceleration switch in an oblique direction and a second acceleration switch in an oblique direction; and the bottom acceleration switch set includes a first acceleration switch in an oblique direction and a second acceleration switch in an oblique direction.

In an exemplary embodiment, an oblique direction of a working surface of the first acceleration switch in the oblique direction and the second acceleration switch in the oblique direction is at an angle of 45 degrees with respect to the horizontal direction.

In an exemplary embodiment, the oblique direction of the acceleration switch in the oblique direction disposed on the top of the cup body and the oblique direction of the acceleration switch in the oblique direction disposed on the bottom of the cup body are orthogonal to each other; and the oblique direction of the second acceleration switch in the oblique direction disposed on the top of the cup body and the oblique direction of the second acceleration switch in the oblique direction disposed on the bottom of the cup body are orthogonal to each other.

The present disclosure provides a method for controlling a spill-proof cup, including the steps of: a controller disposed in the spill-proof cup monitoring a trigger signal from a top acceleration switch set and a bottom acceleration switch set disposed on the spill-proof cup, wherein the top acceleration switch set and the bottom acceleration switch set each includes a first acceleration switch and a second acceleration switch, and a trigger threshold of the second acceleration switch is greater than a trigger threshold of the first acceleration switch; when the controller monitors that at least one of the second acceleration switches is triggered, the controller controlling a cup lid of the spill-proof cup to close; and when the controller monitors that at least one of the first acceleration switches is triggered and neither of the second acceleration switches is triggered, the controller determining whether a reading of a pressure sensor disposed on the cup body is greater than a preset threshold, and controlling the cup lid of the spill-proof cup according to the determination result.

DETAILED DESCRIPTION

Figure 1:
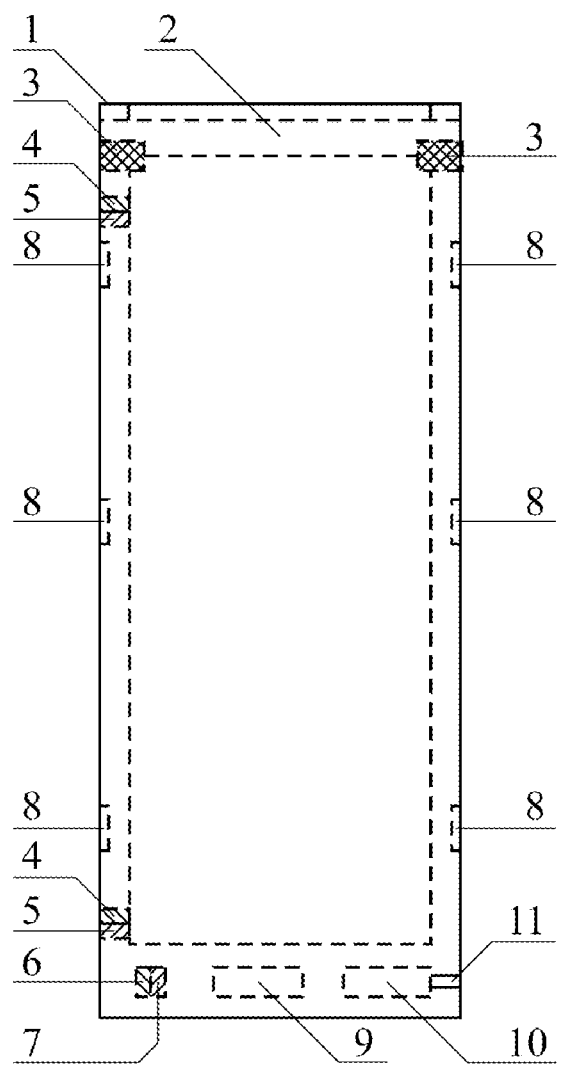
FIG. 1 is a schematic diagram illustrating a structure of a spill-proof cup according to an embodiment of the present disclosure.

The disclosure will be further described in detail below with reference to the accompanying drawings and embodiments. It is to be understood that the specific embodiments described herein are merely illustrative of the disclosure and do not limit the disclosure. It should also be noted that for ease of description, only some of the structures related to the present disclosure are shown in the drawings.

In the related art, an anti-tilt cup is provided, which is divided into three layers: inner and outer layers, a support rod and three sets of springs serving to close the lid. When the cup is placed on a support surface, the bottom of the support rod is held against the surface. When the cup is held in a hand, the grip does not allow the middle layer to move downward. In other cases, if the cup is tilted, the support rod and the middle layer will move downward to bring the cup lid to be closed. The disadvantage of this solution is that it cannot be closed manually when placed on the table, but it can only be kept open. There are other spill-proof cup solutions that may be triggered by stress on the bottom. The common disadvantage is that the cup must be placed on a flat table surface to function. If the tabletop is hollow, it may not be triggered, and it will not work if it is collided when being held in the hand. If the cup is placed on an unstable panel and the panel is overturned, the above solution will not work.

With the emerge of intelligent water cup devices, the power and the controller make the water cups have a variety of functions, the closing device of the cup lid is driven by electricity, and is no longer limited to a delicate mechanical structure. The application of various types of sensors greatly expands the means for detecting a tilt.

At present, there is a solution that proposes an anti-tilt lid and an anti-tilt method, in which a tilt angle sensor detects the tilt angle of the cup. When the tilt angle is greater than a certain threshold, the cup may be automatically closed. The disadvantage of this method is that it requires the controller to monitor the status of the tilt angle sensor at all times, and the power consumption is high. In addition, when the tilt angle reaches the threshold, the cup has already tilted and a small amount of liquid may have spilled before the closure is triggered and the lid is actually closed.

In the related art, there is also a method of preventing the cup from tilting by detecting the change of the posture, detecting the change of the bottom stress, and detecting an abnormal sound (such as a screaming), but the detection of the three requires the controller to monitor the output of the sensor at all times, which causes high power consumption.

In order to overcome the shortcomings of the spill-proof cup in the related art, a spill-proof cup is provided in this embodiment, and a schematic diagram of the structure is shown in FIG. 1.

The spill-proof cup includes: a cup body 1; a cup lid 2 disposed on the top of the cup body; a lid control device 3 connected with the cup lid 2, wherein the lid control device 3 may close the cup lid 2, to block liquid in the cup, and also, the lid control device 3 can also be controlled manually to close or open the cup lid 2; first acceleration switches 4 in a horizontal direction respectively disposed on the top of the cup body and the bottom of the cup body, wherein more than one first acceleration switch 4 in the horizontal direction may be provided on the top of the cup body and more than one first acceleration switch 4 in the horizontal direction may be provided on the bottom of the cup body; and second acceleration switches 5 in a horizontal direction respectively disposed on the top of the cup body and the bottom of the cup body, wherein more than one second acceleration switch 5 in the horizontal direction may be provided on the top of the cup body and more than one second acceleration switch 5 in the horizontal direction may be provided on the bottom of the cup body.

Here, the first acceleration switch is a low trigger threshold acceleration switch, the second acceleration switch is a high trigger threshold acceleration switch, and the trigger threshold of the second acceleration switch is greater than the trigger threshold of the first acceleration switch. This is also true in other embodiments below.

In a preferred embodiment, the trigger threshold of the first acceleration switch is set to less than 1 m/s$^2$; and the trigger threshold of the first acceleration switch is set to be greater than 1 m/s$^2$. However, the embodiment is not limited thereto.

The first acceleration switch and the second acceleration switch disposed on the top are referred to as a top acceleration switch set, and the first acceleration switch and the second acceleration switch disposed on the bottom are referred to as a bottom acceleration switch set. The first acceleration switch and the second acceleration switch with different trigger thresholds work in cooperation. This is also true in other embodiments below.

At least one first acceleration switch 4 and at least one second acceleration switch 5 in the horizontal direction is mounted on the top of the cup body 1, and at least one horizontal first acceleration switch 4 and at least one second acceleration switch 5 in the horizontal direction is mounted on the bottom of the cup body 1. This is due to the fact that since the cup body 1 is generally placed vertically on a plane, at the moment when a collision acts on the bottom of the cup body 1, the acceleration at the top of the cup body 1 may not change significantly; and at the moment when a collision acts on the top of the cup body 1, the acceleration at the bottom of the cup body 1 may not change significantly. The top and bottom acceleration switches can detect collision at different portions.

Figure 2:
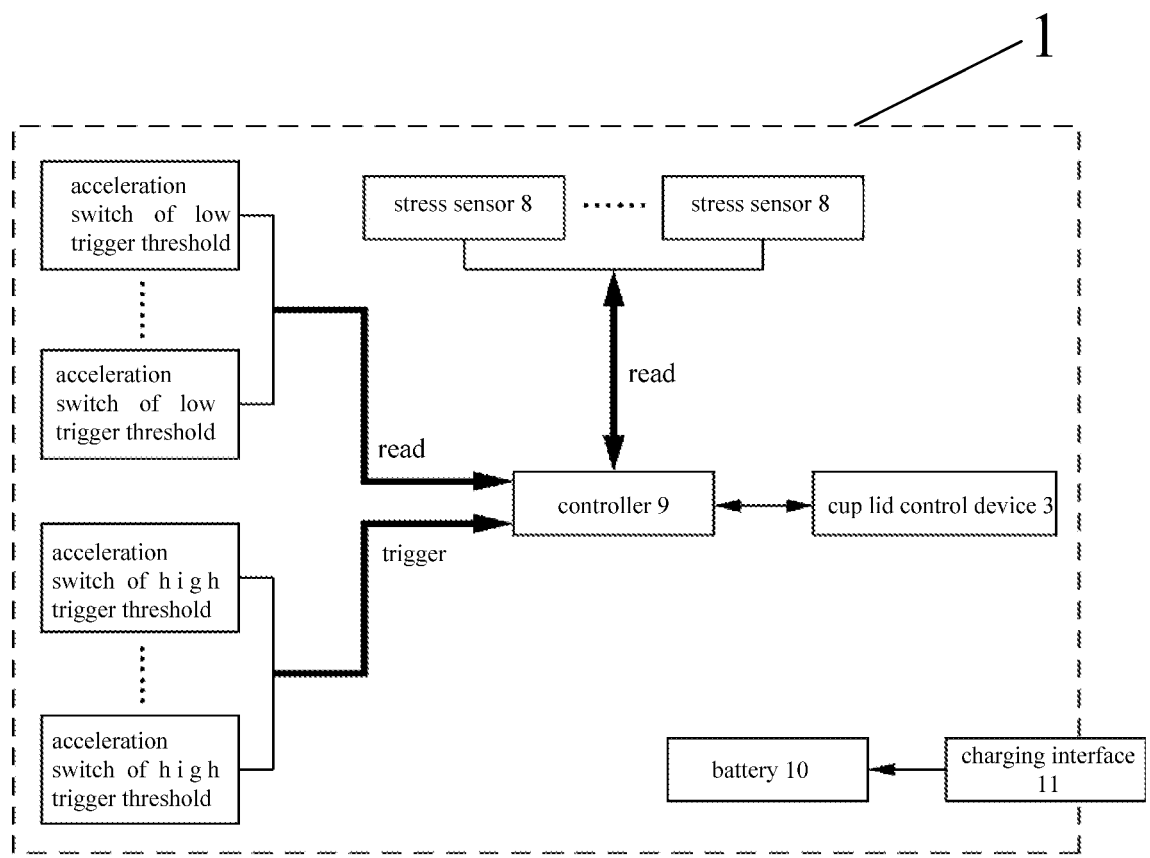
FIG. 2 is a schematic diagram illustrating a connection relationship among elements of a spill-proof cup according to an embodiment of the present disclosure.

The spill-proof cup further includes a controller 9, which is connected to the first acceleration switch 4 in the horizontal direction, the second acceleration switch 5 in the horizontal direction, and the lid control device 3. The cup body 1 according to the embodiment is also provided with a battery 10 and a charging interface 11 therein, and the connection relationship therebetween is as shown in FIG. 2.

Each acceleration switch can send an electrical signal to the controller 9 when triggered by a collision. The controller 9 reacts according to the received electrical signal, or controls the lid control device 3 to close the cup lid, or does not perform any action.

Specifically, for a slight collision, at least one of the first acceleration switches 4 in the horizontal direction will be triggered, and none of the second acceleration switches 5 in the horizontal direction will be triggered. Similarly, for a violent collision, not only at least one of the first acceleration switches 4 in the horizontal direction will be triggered, but also at least one of the second acceleration switches 5 in the horizontal direction will be triggered. That is, a slight collision may trigger at least one first acceleration switch and no second acceleration switch; and a violent collision may trigger at least one first acceleration switch and may trigger at least one second acceleration switch.

When the controller 9 receives a trigger signal from the second acceleration switch 5 in the horizontal direction, and when the controller 9 determines that the cup is subject to a violent collision, the controller 9 sends a signal to the lid control device 3 to close the cup lid 2 and prevent the tilt of the cup. This can intelligently achieve the spill proof function of the cup.

In an embodiment, the spill-proof cup further includes stress sensors 8 mounted at the outer side surface of the lower and middle portions of the cup body 1, to detect the degree of tightness of the water cup held by the hand, and the result of the detection is shown as a number, read by the controller 9. The stress sensor 8 is preferably a piezoresistive stress sensor, which is small in size and low in power consumption. Although the accuracy is affected by the temperature, the grip detection in this technical solution does not require high precision.

When the controller 9 receives a signal indicating that at least one of the first acceleration switches 4 provided on the top and bottom of the cup body is triggered, and none of the second acceleration switches 5 is triggered, it is considered that there is a slight collision and the controller 9 reads the value indicated by the stress sensors 8. Also, a preset threshold is stored in the controller 9. If the controller 9 determines that the value indicated by the stress sensor is greater than the preset threshold, it is considered that the hand is held tightly and the controller 9 will not act; if the number of the stress sensor is less than the preset threshold, it is considered that the hand is not held or not held steadily and will act to close the cup lid.

When at least one second acceleration switch is triggered, no matter whether the first acceleration switch is triggered or not, it is considered that there is a violent collision. At this time, the value indicated by the stress sensors 8 is no longer read and determined, and no matter whether the hand grips or not, a signal is sent to the lid control device 3 to close the cup lid 2.

The above-mentioned acceleration switches are all acceleration switches in the horizontal direction and can respond to most of the collisions acting on the cup body in the horizontal direction and send a trigger signal. However, the direction of the collision may also be vertical. In one embodiment, therefore, the first acceleration switch 6 in a vertical direction which is a low threshold acceleration switch and the second acceleration switch 7 in a vertical direction which is a high threshold acceleration switch are mounted on the bottom of the cup body 1, working in cooperation with the acceleration switches in the horizontal direction, and reacting to impacts from all directions.

When at least one of the first acceleration switch 4 in the horizontal direction and the first acceleration switch 6 in the vertical direction is triggered and none of the second acceleration switches 5 in the horizontal direction and the second acceleration switches 7 in the vertical direction is triggered, it is considered that a slight collision occurs. If the value indicated by the stress sensor is greater than the preset threshold, it is considered that the hand is tightly held and no action is taken. If the controller 9 reads that the value indicated by the stress sensor is less than the preset threshold, it is considered that the hand is not held or not held steadily, and the controller 9 sends a signal to the lid control device 3 to close the cup lid. When at least one of the second acceleration switches 5 in the horizontal direction and the second acceleration switch 7 in the vertical direction is triggered, regardless of whether the first acceleration switch is triggered, it is considered that there is a violent collision. At this time, regardless of whether the hand is gripped, the cup lid is closed.

Both of the first acceleration switch 6 and the second acceleration switch 7 in the vertical direction are calibrated with gravity. When only gravity is applied, states of the core triggering components thereof are comparable to the core triggering components when placed horizontally.

The first acceleration switch 4 in the horizontal direction, the second acceleration switch 5 in the horizontal direction, the first acceleration switch 6 in the vertical direction, and the second acceleration switch 7 in the vertical direction, are preferably MEMS (microelectromechanical system) bistable acceleration switches. The MEMS device is small in size, low in power consumption, and high in reliability. The bistable acceleration switch can effectively remove the interference of high-frequency disturbance and avoid malfunction.

According to the spill-proof cup of the present embodiment, by providing an acceleration switch with a low trigger threshold and an acceleration switch with a high trigger threshold at the top and bottom of the cup body, the water cup can be controlled more accurately, the spill of the water cup can be prevented, and there is no need to detect the output of the sensor at all times, thereby reducing energy consumption.

Figure 3:
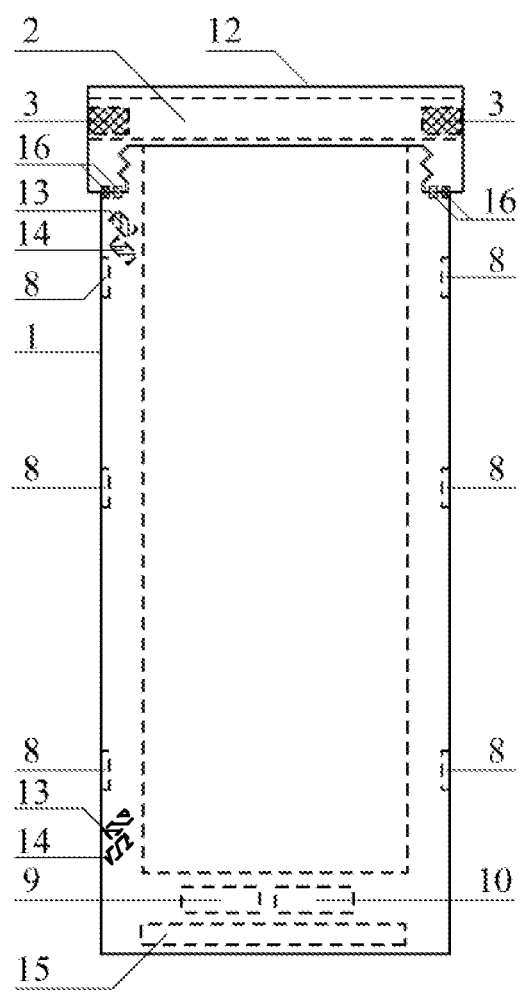
FIG. 3 is a schematic diagram illustrating a structure of a spill-proof cup according to another embodiment of the present disclosure.

Another embodiment of the present disclosure provides another spill-proof cup. A schematic diagram of the structure is shown in FIG. 3. The acceleration switch used in this embodiment is an acceleration switch in an oblique direction.

The spill-proof cup includes: a cup body 1; a cup lid 2 disposed on the top of the cup body; a lid control device 3 connected with the cup lid 2, wherein the lid control device 3 may close the cup lid 2, to block liquid in the cup, and also, the lid control device 3 can also be controlled manually to close or open the cup lid 2; first acceleration switches 13 in an oblique direction disposed on the top of the cup body and the bottom of the cup body, wherein more than one first acceleration switch 13 in the oblique direction may be provided on the top of the cup body and more than one first acceleration switch 13 in the oblique direction may be provided on the bottom of the cup body; and second acceleration switches 14 in the oblique direction respectively disposed on the top of the cup body and the bottom of the cup body, wherein more than one second acceleration switch 14 in the oblique direction may be provided on the top of the cup body and more than one second acceleration switch 14 in the oblique direction may be provided on the bottom of the cup body.

Stress sensors 8 are mounted on the outer surfaces of the lower and middle portions of the cup body 1. The cup body 1 has a controller 9 and a battery 10 therein. There is a wireless charging coil 15 in the bottom of the cup body 1, and the bottom surface of the cup body 1 is non-metallic material. After the cup lid housing 12 is screwed, the annular electrode piece 16 at the bottom of the cup lid housing 12 is in close contact with the annular electrode piece 16 at the top of the cup body 1, so that the lid control device 3 is in communication with the controller 9 and the battery 10 via a circuit.

In the present embodiment, the oblique direction of the working surface of the oblique acceleration switch is at an angle of 45 degrees with respect to the horizontal direction. The working surface of the oblique acceleration switch is a surface that senses external collision. The working surface of the oblique acceleration switch is a plane, and its oblique direction is at an angle of 45 degrees with respect to the horizontal direction. Moreover, as shown in FIG. 3, the oblique direction of the oblique acceleration switch 13 of the first trigger threshold disposed on the top of the cup body and the oblique direction of the oblique acceleration switch 13 of the first trigger threshold disposed on the bottom of the cup body are orthogonal to each other; and the oblique direction of the second oblique acceleration switch 14 disposed on the top of the cup body and the oblique direction of the second oblique acceleration switch 14 disposed on the bottom of the cup body are orthogonal to each other. Such a configuration enables the acceleration switches to more effectively respond to collisions from all directions, send a trigger signal, and the accuracy of the determination can be improved.

Similar to the first embodiment, when the controller 9 receives a signal indicating that at least one of the first acceleration switches 13 in the oblique direction provided on the top and bottom of the cup body is triggered, and none of the second acceleration switches 14 in the oblique direction is triggered, it is considered that there is a slight collision. At this time, if the controller 9 reads that the value indicated by the stress sensors 8 is greater than the preset threshold, it is considered that the hand is held tightly and the controller 9 will not act; if the number of the stress sensor is less than the preset threshold, it is considered that the hand is not held or not held steadily and the controller 9 sends a signal to the lid control device 3 to close the cup lid.

When at least one second acceleration switch is triggered, no matter whether the first acceleration switch is triggered or not, it is considered that there is a violent collision. At this time, the value indicated by the stress sensors 8 is no longer read and determined, and no matter whether the hand grips or not, a signal is sent to the lid control device 3 to close the cup lid 2.

According to the spill-proof cup of the present embodiment, by providing an oblique acceleration switch with a low trigger threshold and an oblique acceleration switch with a high trigger threshold at the top and bottom of the cup body, it is possible to more accurately sense collisions from all directions and issue a trigger signal timely, to realize more accurate control of the cup to prevent spill of the cup, and there is no need to detect the output of the sensor at all times, thereby reducing energy consumption This embodiment provides a method for controlling a spill-proof cup to control the spill-proof cup as described above.

Figure 4:
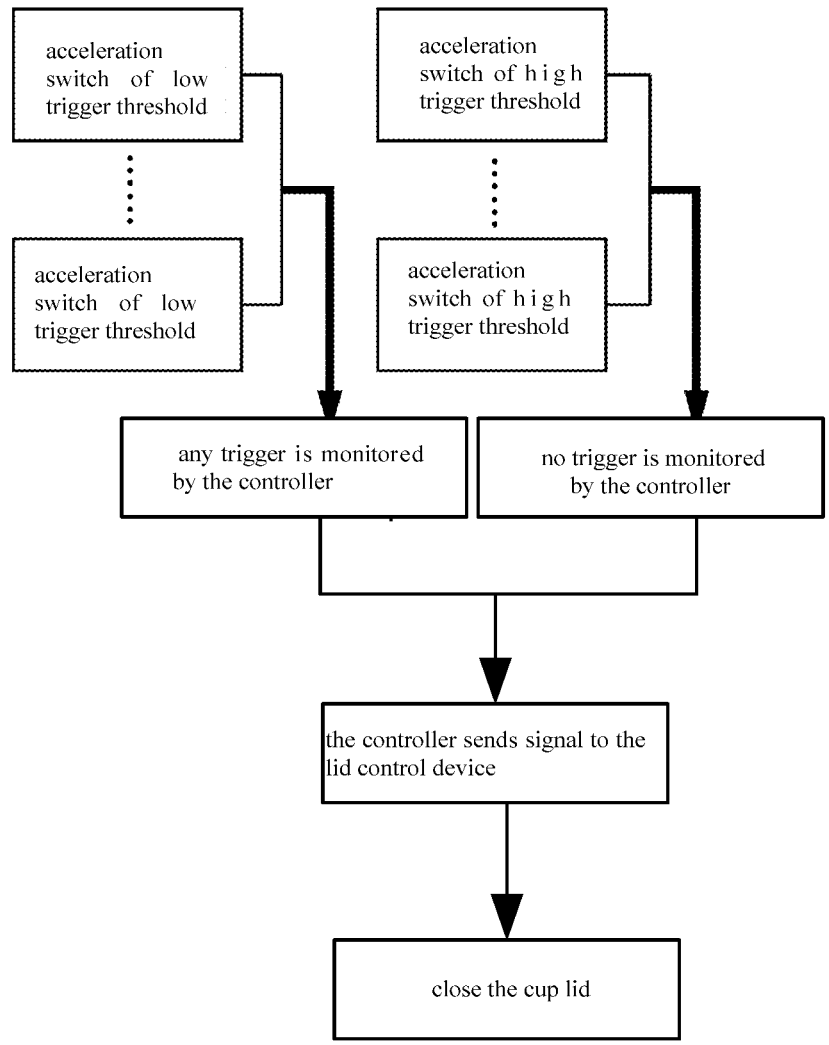
FIG. 4 is a schematic diagram illustrating a control process of the spill-proof cup according to an embodiment of the present disclosure.

As shown in FIG. 4, the control method includes: a controller provided in the spill-proof cup monitoring a trigger signal from a top acceleration switch set and a bottom acceleration switch set provided on the spill-proof cup. The top acceleration switch set and the bottom acceleration switch set respectively include a first acceleration switch and a second acceleration switch, and a trigger threshold of the second acceleration switch is greater than a trigger threshold of the first acceleration switch.

When the controller monitors that at least one of the second acceleration switches in the top acceleration switch set and the bottom acceleration switch set is triggered, the controller controls the cup lid of the spill-proof cup to close.

When the controller monitors that at least one of the first acceleration switches is triggered and neither of the second acceleration switches is triggered, the controller determines whether the value of the stress sensor provided on the cup body is greater than the preset threshold, the cup lid of the spill-proof cup is controlled according to the determination result.

Figure 5:
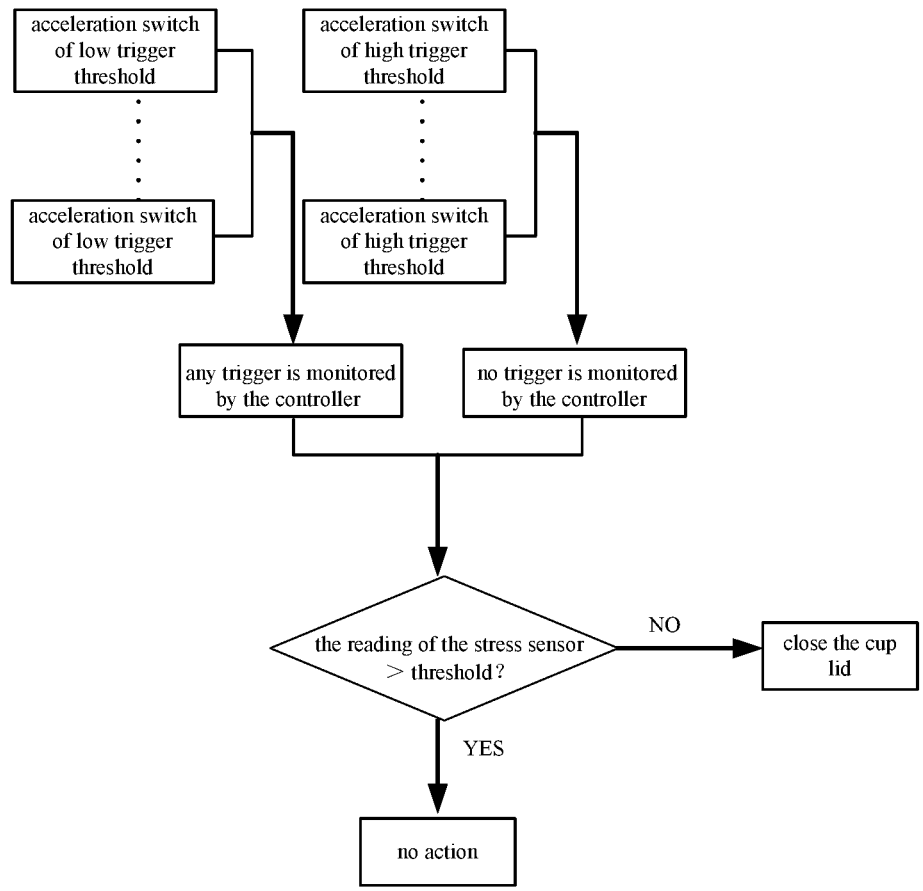
FIG. 5 is a schematic diagram illustrating a control process of the spill-proof cup according to an embodiment of the present disclosure.

Specifically, as shown in FIG. 5, when at least one of the first acceleration switches of the controller 9 receives a signal indicating that at least one of the first acceleration switches in the top acceleration switch set and the bottom acceleration switch set is triggered, and none of the second acceleration switches is triggered, it is considered that the collision is slight. At this time, the controller 9 will take a further determination by reading the size of the hand holding force detected by the stress sensor 8. If the value indicated by the reading is greater than the preset threshold, it is considered that the hand holds tightly and no action is needed. If the value indicated by the stress sensors is smaller than the preset threshold, it is considered that the hand is not holding or is not holding steadily, the controller 9 sends a signal to the lid control device 3 to close the cup lid.

The top acceleration switch set includes a first acceleration switch in the horizontal direction and a second acceleration switch in the horizontal direction; and the bottom acceleration switch set includes a first acceleration switch in the horizontal direction and a second acceleration switch in the horizontal direction.

Alternatively, the top acceleration switch set includes a first acceleration switch in the horizontal direction and a second acceleration switch in the horizontal direction; and the bottom acceleration switch set includes a first acceleration switch in the horizontal direction, a first acceleration switch in the vertical direction, a second acceleration switch in the horizontal direction and a second acceleration switch in the vertical direction.

Alternatively, the top acceleration switch set includes a first acceleration switch in an oblique direction and a second acceleration switch in an oblique direction; and the bottom acceleration switch set includes a first acceleration switch in an oblique direction and a second acceleration switch in an oblique direction.

In one embodiment, both of acceleration switches in the horizontal direction and acceleration switches in the vertical direction are employed. In one embodiment, only acceleration switches in oblique directions are employed.

According to the control method of this embodiment, the controller is configured to monitor the acceleration switches provided on the top and bottom of the cup body to more accurately sense the collisions from all directions and send the trigger signals timely, and respond accordingly based on the degree of collision. The spill of the water cup can be prevented, and there is no need to detect the output of the sensor at all times, thereby reducing energy consumption.

It should be understood by those skilled in the art that the present disclosure is not limited to the specific embodiments described herein, and various obvious variations, modifications, and substitutions can be made by those skilled in the art without departing from the scope of the disclosure. Therefore, although the present disclosure has been described in more detail through the above embodiments, the present disclosure is not limited to the above embodiments, and other equivalent embodiments may also be included without departing from the concept of the present disclosure. The scope of the present disclosure is determined by the appended claims.

What is claimed is:
1. A spill-proof cup, comprising:
   a cup body,
   a cup lid disposed at top of the cup body;
   a lid control device connected to the cup lid for opening or closing the cup lid;
   a top acceleration switch set disposed on the top of the cup body, and the top acceleration switch set comprising a first acceleration switch and a second acceleration switch;

a bottom acceleration switch set disposed at bottom of the cup body, and the bottom acceleration switch set comprising a first acceleration switch and a second acceleration switch;

a controller connected to the first acceleration switches, the second acceleration switches and the lid control device, and configured to receive signals from the first acceleration switches and the second acceleration switches, and control the lid control device according to the signals;

wherein a triggering threshold of the second acceleration switch is greater than a triggering threshold of the first acceleration switch.

2. The spill-proof cup according to claim 1, wherein the controlling the lid control device according to the signal comprises: when the controller receives a signal from the second acceleration switch, the controller controlling the lid control device to close the cup lid.

3. The spill-proof cup according to claim 1, further comprising a stress sensor disposed on an outer side surface of the cup body, wherein the controller is configured to acquire a reading of the stress sensor to determine whether to close the cup lid.

4. The spill-proof cup according to claim 3, wherein the controlling the lid control device according to the signal comprises: when the controller receives a signal from the first acceleration switch and no signal from the second acceleration switch, the controller is configured to control the lid control device based on a reading from the pressure sensor.

5. The spill-proof cup according to claim 1, wherein the top acceleration switch set comprises a first acceleration switch in a horizontal direction and a second acceleration switch in the horizontal direction; and the bottom acceleration switch set comprises a first acceleration switch in the horizontal direction and a second acceleration switch in the horizontal direction.

6. The spill-proof cup according to claim 2, wherein the top acceleration switch set comprises a first acceleration switch in a horizontal direction and a second acceleration switch in the horizontal direction; and the bottom acceleration switch set comprises a first acceleration switch in the horizontal direction and a second acceleration switch in the horizontal direction.

7. The spill-proof cup according to claim 3, wherein the top acceleration switch set comprises a first acceleration switch in a horizontal direction and a second acceleration switch in the horizontal direction; and the bottom acceleration switch set comprises a first acceleration switch in the horizontal direction and a second acceleration switch in the horizontal direction.

8. The spill-proof cup according to claim 4, wherein the top acceleration switch set comprises a first acceleration switch in a horizontal direction and a second acceleration switch in the horizontal direction; and the bottom acceleration switch set comprises a first acceleration switch in the horizontal direction and a second acceleration switch in the horizontal direction.

9. The spill-proof cup according to claim 1, wherein the top acceleration switch set comprises a first acceleration switch in a horizontal direction and a second acceleration switch in the horizontal direction; and the bottom acceleration switch set comprises a first acceleration switch in the horizontal direction, a first acceleration switch in a vertical direction, a second acceleration switch in the horizontal direction and a second acceleration switch in the vertical direction.

10. The spill-proof cup of claim 2, wherein the top acceleration switch set comprises a first acceleration switch in a horizontal direction and a second acceleration switch in the horizontal direction; and the bottom acceleration switch set comprises a first acceleration switch in the horizontal direction, a first acceleration switch in a vertical direction, a second acceleration switch in the horizontal direction and a second acceleration switch in the vertical direction.

11. The spill-proof cup according to claim 3, wherein the top acceleration switch set comprises a first acceleration switch in a horizontal direction and a second acceleration switch in the horizontal direction; and the bottom acceleration switch set comprises a first acceleration switch in the horizontal direction, a first acceleration switch in a vertical direction, a second acceleration switch in the horizontal direction and a second acceleration switch in the vertical direction.

12. The spill-proof cup according to claim 4, wherein the top acceleration switch set comprises a first acceleration switch in a horizontal direction and a second acceleration switch in the horizontal direction; and the bottom acceleration switch set comprises a first acceleration switch in the horizontal direction, a first acceleration switch in a vertical direction, a second acceleration switch in the horizontal direction and a second acceleration switch in the vertical direction.

13. The spill-proof cup of claim 1, wherein the top acceleration switch set comprises: a first acceleration switch in an oblique direction and a second acceleration switch in an oblique direction; and the bottom acceleration switch set comprises a first acceleration switch in an oblique direction and a second acceleration switch in an oblique direction.

14. The spill-proof cup according to claim 2, wherein the top acceleration switch set comprises: a first acceleration switch in an oblique direction and a second acceleration switch in an oblique direction; and the bottom acceleration switch set comprises a first acceleration switch in an oblique direction and a second acceleration switch in an oblique direction.

15. The spill-proof cup according to claim 3, wherein the top acceleration switch set comprises: a first acceleration switch in an oblique direction and a second acceleration switch in an oblique direction; and the bottom acceleration switch set comprises a first acceleration switch in an oblique direction and a second acceleration switch in an oblique direction.

16. The spill-proof cup of claim 4, wherein the top acceleration switch set comprises: a first acceleration switch in an oblique direction and a second acceleration switch in an oblique direction; and the bottom acceleration switch set comprises a first acceleration switch in an oblique direction and a second acceleration switch in an oblique direction.

17. The spill-proof cup according to claim 13, wherein an oblique direction of a working surface of the first acceleration switch in the oblique direction and the second acceleration switch in the oblique direction is at an angle of 45 degrees with respect to the horizontal direction.

18. The spill-proof cup according to claim 14, wherein an oblique direction of a working surface of the first acceleration switch in the oblique direction and the second acceleration switch in the oblique direction is at an angle of 45 degrees with respect to the horizontal direction.

19. The spill-proof cup of claim 17, wherein the oblique direction of the acceleration switch in the oblique direction disposed on the top of the cup body and the oblique direction of the acceleration switch in the oblique direction disposed on the bottom of the cup body are orthogonal to each other;

and the oblique direction of the second acceleration switch in the oblique direction disposed on the top of the cup body and the oblique direction of the second acceleration switch in the oblique direction disposed on the bottom of the cup body are orthogonal to each other.

\* \* \* \* \*